July 1, 1930.   I. ELLIOTT   1,768,752
BAKING OVEN
Filed March 24, 1928   2 Sheets-Sheet 2

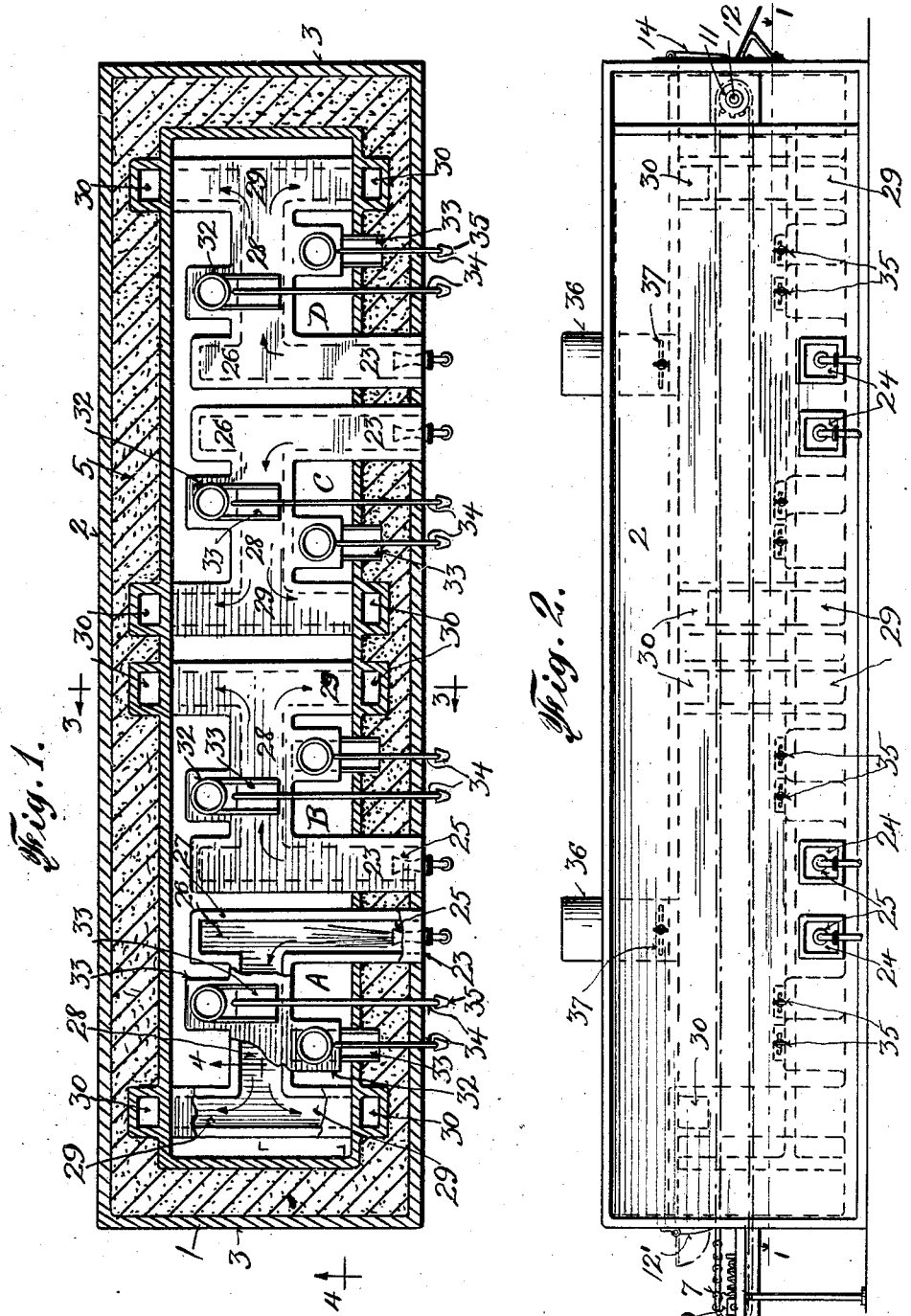

Patented July 1, 1930

1,768,752

UNITED STATES PATENT OFFICE

IRWIN ELLIOTT, OF NEW YORK, N. Y., ASSIGNOR TO UNIVERSAL OVEN COMPANY, INC., OF NEW YORK, N. Y., A CORPORATION OF NEW YORK

BAKING OVEN

Application filed March 24, 1928. Serial No. 264,361.

My present invention relates to baking ovens of the commercial type and I have shown the invention embodied in a long oven adapted for continuous operation, and in which the products are conveyed through the baking chamber by endless chain carriers. The device is therefore what is generally termed a traveling oven. Ovens of this type are usually very long and it has been customary to provide a number of gas burners within the baking chamber when the direct system of heating has been employed. In such cases it has been necessary to provide a great many burners of the jet type, each of which requires more or less attention for regulation, and due to the great number of these, a great deal of time is consumed in regulating the burners to maintain the desired temperatures throughout different portions of the baking chamber. In other devices it has been the practice to heat the baking chamber by an indirect system wherein the flames from the burners first heat a body of firebrick and the heat is conducted through the latter to the baking chamber. In the latter systems the response to the regulation of the heating medium as represented by changes of temperature in the baking chamber have been slow, so that heretofore in obtaining the advantages of either of these systems it has been necessary to sacrifice the advantages of the other system. One object of the present invention, therefore, is to obtain all of the advantages of both a direct and an indirect heating system and to obtain the advantages of the best method for maintaining the bottom heat in the baking chamber and also to maintain the desired top heat, and in addition to retain all of the advantages of the quick response to regulation resulting from the use of a direct heating system. For this purpose I provide a plurality of flues constructed of material such as firebrick, which will store up the heat and give it off by indirect action to the baking chamber; and the products of combustion after acting on the body of firebrick to provide the bottom heat for the baking chamber, pass directly into the latter to provide the top heat and to come into direct contact with the products which are being baked.

Another advantage of the present construction is that I am enabled to use the blast type of burner instead of the jet type, which in itself is an advantage because the blast type is more efficient. In addition, I am enabled to reduce the number of burners in the long oven to say four as against say fifty, which would be required with the jet type of burner. There are, therefore, fewer burners to regulate to maintain a uniform temperature in the baking chamber. Furthermore, regulation with the present oven is not required as often as in the previous type using jet burners. Other advantages will be apparent from the following detailed description of my invention.

In the drawings forming part of this application,

Figure 1 is a horizontal, sectional view through an oven embodying my invention and it is taken on the line 1—1 of Figure 2.

Figure 2 is a side elevation of the oven.

Figure 3:
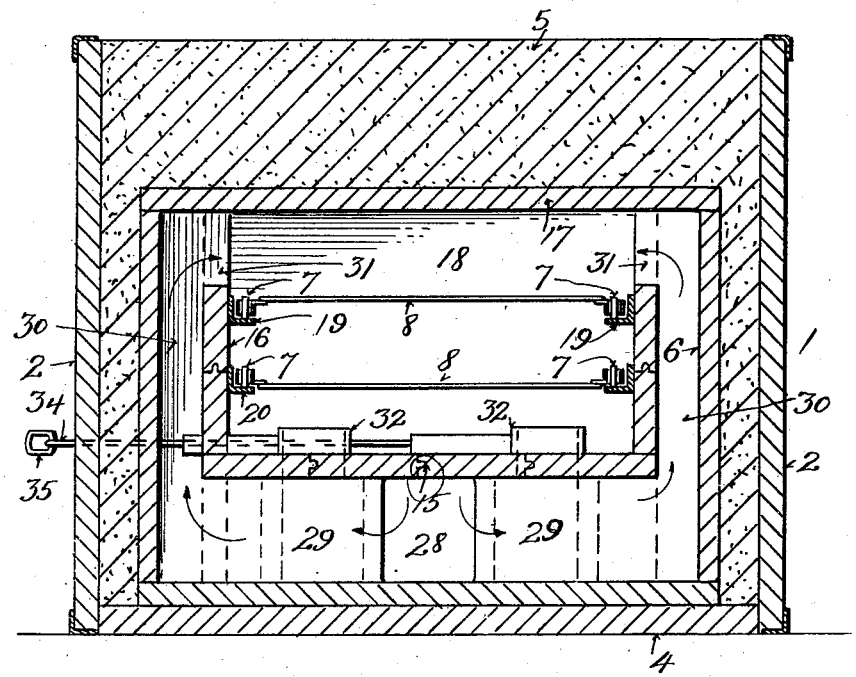
Figure 3 is a cross sectional view taken on the line 3—3 of Figure 1.

In the drawings I have shown the long type of oven constructed in many respects to conform to present practice. This comprises an outer shell 1, here shown as of rectangular shape and comprising side walls 2, end walls 3 and a bottom 4. Within these walls there is provided a filler for insulating the baking chamber to conserve the heat and this is shown as a body 5 which may consist of kieselguhr or other diatomaceous earth, as is common practice in the art. There is a metal shell or lining 6 inside the outer surface 1 and spaced from it to provide the space for the insulating body or filler 5. This shell 6 is here shown as substantially rectangular in shape and part of the space within it comprises the baking chamber.

The means for conveying the products to be baked through the oven may be any of the well known types of conveyors. I have shown herein endless chains 7, spaced apart and moving parallel with each other and between them are connected the plates 8, one for each link in the chains, to form a continuous supporting surface for the products. These chains travel around a pair of sprockets 9 mounted on a shaft 10 arranged just outside of and near one end of the oven. They also travel around a similar pair of sprockets 11 mounted on a shaft 12 near the other end of the oven. These chains may be operated by any of the well known drives used in present practice.

Figure 4:
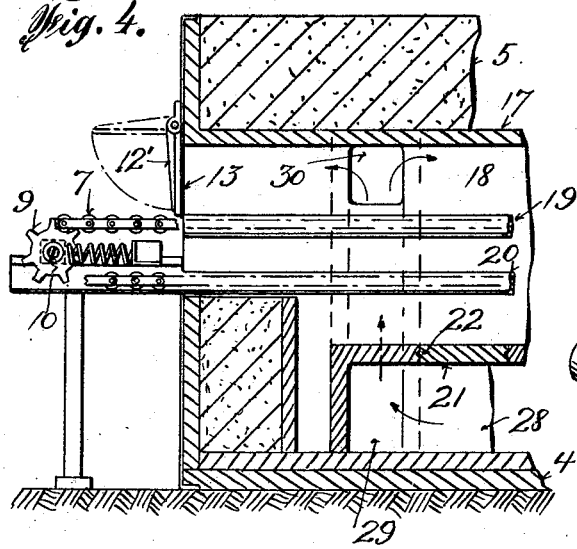
Figure 4 is an enlarged fragmentary sectional view taken on the line 4 of Figure 1.
Figure 5:
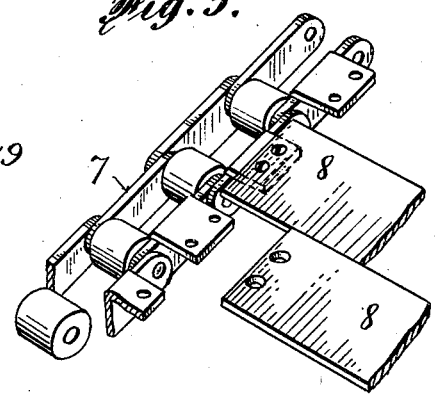
Figure 5 is a perspective view of a portion of the conveyor which conveys the product through the baking chamber.

There is a door 12' hinged to the end wall of the oven, for closing the opening 13 above the upper runs of the chains, which door may be swung upwardly as shown dotted in figure 4 when the products to be baked are being placed on the conveyor. There is a similar hinged door 14 at the opposite end of the oven for permitting the baked articles to be discharged from the conveyor after traveling through the oven.

There are angle metal tracks 19 secured to the side walls 16 for supporting the upper runs of the conveyor chains. There are other angle metal tracks 20 also secured to these walls to form the supports for the lower runs of the chains to travel on. The conveyor carries the products (on the upper run) through the baking chamber 18.

The devices for conducting the bottom heat to the baking chamber and for forming the combustion chambers are preferably constructed in several units. I have shown by way of example four such units, A, B, C and D, of which A and C are similar and B and D are similar, but differing from A and C in that the parts are reversed in position. These several units are made of firebrick or any other material which will store up and by saturation and conduction give up the bottom heat to the baking chamber under the principle of indirect heating. These units, therefore, are preferably built up of firebricks 21 having tongue and groove or similar joints 22. The unit A consists of a portion 23 which has one end extending through one side of the oven and this end is closed by a plate 24 through which projects a gas burner 25, preferably of the blast type and therefore of large capacity and efficient in operation. The portion 23 of the unit A extends through the members 2, 5, 6 forming one of the sides of the outer structure of the oven; and thence it extends laterally of the oven. The flame from the burner is projected into this flue section 23 of the unit A where all or nearly all of the combustion from this burner occurs. The flue is composed of a bottom wall 26 and the side walls 27 and the top wall 15.

The portion 23 of the flue is shown extending almost entirely across the width of the baking chamber. The flue branches off at 28 into a portion extending lengthwise of the oven and this runs along the middle plane of the latter, and therefore this portion branches from the first portion 23 at a point between the ends of the latter. The products of combustion after traversing the flue section 23 pass through the section 28. The section 28 connects with lateral branches 29 extending in opposite directions. These branches deliver the divided stream of products of combustion into vertical flues 30 formed in the walls of the liner 6 and these vertical flues communicate with apertures 31 in the side walls 16 so that the products of combustion discharge into the upper portion of the baking chamber 18 and above the conveyor and they furnish the top, direct heat.

There are vertical branches 32 extending from the flue section 28 at opposite sides of the median line of the oven, and they extend through the top wall 15 of the flue chamber and discharge some of the products of combustion into the lower portion of the baking chamber 18 and below the lower run of the conveyor to provide the bottom, direct heat. These branches 32 are provided with individual dampers 33 operated by rods 34 projecting through the walls of the oven to be manipulated by the handles 35.

The unit B is like the unit A just described, except that the positions of the parts are reversed as shown, in order that the operator may in one position regulate the burners in both the A and B units. The B unit has all the parts present in the unit A and they are similarly lettered. The unit C is like the unit A but the unit D has the position of its parts reversed like the unit B. The burners 25 of units C and D are therefore brought close together to be operated from one position.

I have shown in the present illustration two stacks 36 for conveying the products of combustion from the baking chamber 18 and delivering the same into the open air; and the flow through these may be regulated by the dampers 37.

When the oven is first set into operation with all of the burners 25 in operation, the flames are projected into the flue sections 23 of the several units. The hot gases travel along the flue section 23 crosswise of the oven, giving up some of their heat units to the walls 26, 27 and to the walls of the baking chamber. The hot gases then pass from the flue sections 23 into the flue sections 28 and thence travel lengthwise of the oven, continuing to give up heat units to the several walls. The gases then pass through the lateral branch flues 29 to opposite sides of the oven, thence through the vertical flue sections 30 and the opening 31 into the baking chamber 18 above the conveyor.

The same action takes place in all of the units A, B, C and D. Some of the heat from the hot gases is continuously absorbed by the walls of the flue units and this heat is given up by conduction to the baking chamber. This is the indirect heating action of the oven. It renders the operation of the oven more steady and uniform but is slow in response to regulation. The hot gases which pass through the flues and discharge through the apertures 31 enter the upper portion of the baking chamber and come into direct contact with the products on the conveyor and therefore provide the top and direct heat.

Part of the hot gases is diverted through the vertical flue sections 32 and enters the lower portion of the baking chamber to provide the bottom, direct heat. This may be regulated by the dampers 33 which is sufficient regulation, in addition to regulation of the burners 25 and the dampers 37 to maintain uniform temperature throughout the length and width of the baking chamber.

With the present combination I am able to reduce the number of burners and to use the blast type of burner and thereby simplify the regulation of the combustion for the whole oven. I obtain all of the advantages of indirect heating by reason of the storing and conduction action of the firebrick walls and at the same time I obtain the advantages of direct heating, including rapid starting of the oven and rapid response to regulation of temperature. There is also economy in fuel consumption. All of which advantages may be obtained with a long type of traveling oven. It will be understood that I do not limit my invention to the single embodiment herein described but include all modifications which come within the scope of the following claim.

Having described my invention, what I claim is:

A baking oven having a baking chamber adapted to be heated by direct and indirect heating means, flues adjacent the baking chamber having walls of heat absorbing and conducting material for conducting heat indirectly to the baking chamber, each flue having a portion extending laterally of said baking chamber, burners in said lateral portions of the flues, said laterally extending portions of adjacent flues being disposed adjacent each other, said flues having portions extending from said lateral portions longitudinally of said baking chamber in opposite directions, branches extending laterally from said longitudinally extending portions, the products of combustion successively passing through said several portions of the flue and means for delivering the products of combustion from said flues into the baking chamber.

Signed at the city, county and State of New York, this 6th day of March, 1928.

IRWIN ELLIOTT.